United States Patent
Barnhard et al.

(10) Patent No.: US 7,288,719 B2
(45) Date of Patent: Oct. 30, 2007

(54) HAZARDOUS LOCATION SEALING GLAND

(75) Inventors: Gary A. Barnhard, Orchard Park, NY (US); Paul Marinaccio, Hamburg, NY (US); Richard C. Paluch, Blasdell, NY (US)

(73) Assignee: Conax Buffalo Technologies LLC, Buffalo, NY (US)

( * ) Notice: Subject to any disclaimer, the term of this patent is extended or adjusted under 35 U.S.C. 154(b) by 57 days.

(21) Appl. No.: 11/335,238

(22) Filed: Jan. 19, 2006

(65) Prior Publication Data
US 2007/0163799 A1   Jul. 19, 2007

(51) Int. Cl.
*H02G 15/02* (2006.01)
(52) U.S. Cl. .................................. 174/77 R
(58) Field of Classification Search ............ 174/77 R; 429/183
See application file for complete search history.

(56) References Cited

U.S. PATENT DOCUMENTS 3,055,972 A * 9/1962 Peterson ................ 174/151
3,197,085 A * 7/1965 Deters et al. ............. 222/333
3,472,701 A * 10/1969 Selover et al. ............ 429/183

* cited by examiner

Primary Examiner—Chau N. Nguyen
(74) Attorney, Agent, or Firm—Phillips Lytle LLP

(57) ABSTRACT

A sealing gland (20) suitable for use in a hazardous environment is adapted to prevent fluid flow, pressure transmission and flame propagation between the gland and the penetrant portions of insulated electrical wires passing therethrough, and within and along such penetrant portions. The improved sealing gland includes a tubular body (21), a first insulator (22), a sealant (23), a second insulator (24), a follower (25), and a cap (26). The sealing gland is so dimensioned and proportioned that when the cap is tightened on the body, the sealant will be deformed into fluid-tight pressure-sealed engagement with the body and wire to prevent fluid flow, pressure transmission and flame propagation between the gland and wires, and within and along the penetrant portions of the wires.

12 Claims, 2 Drawing Sheets

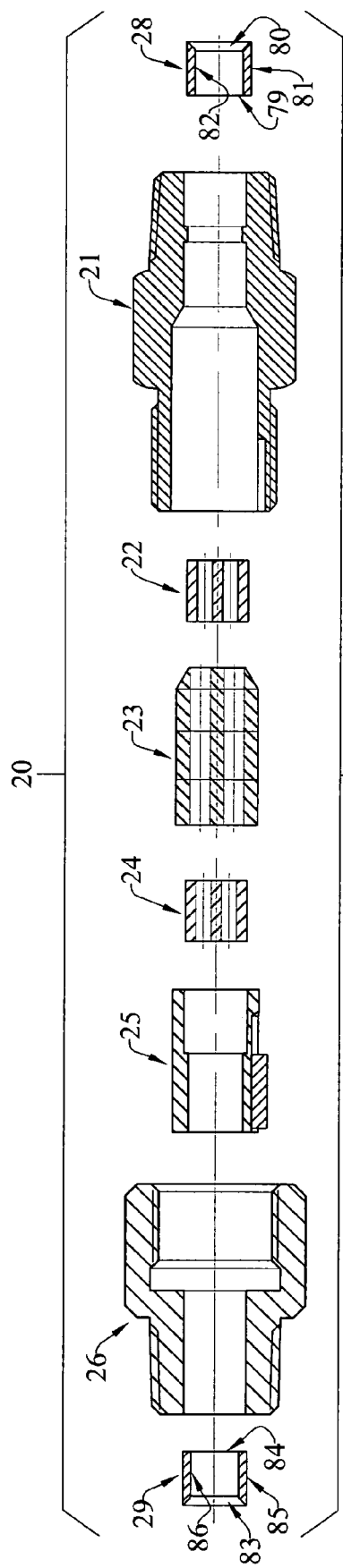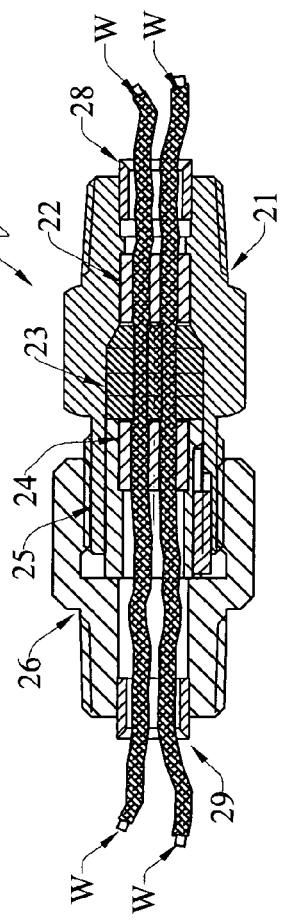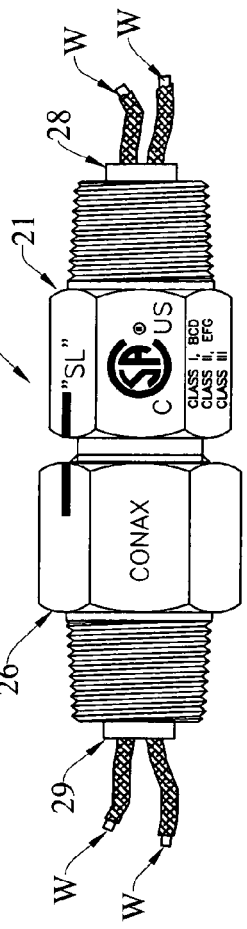

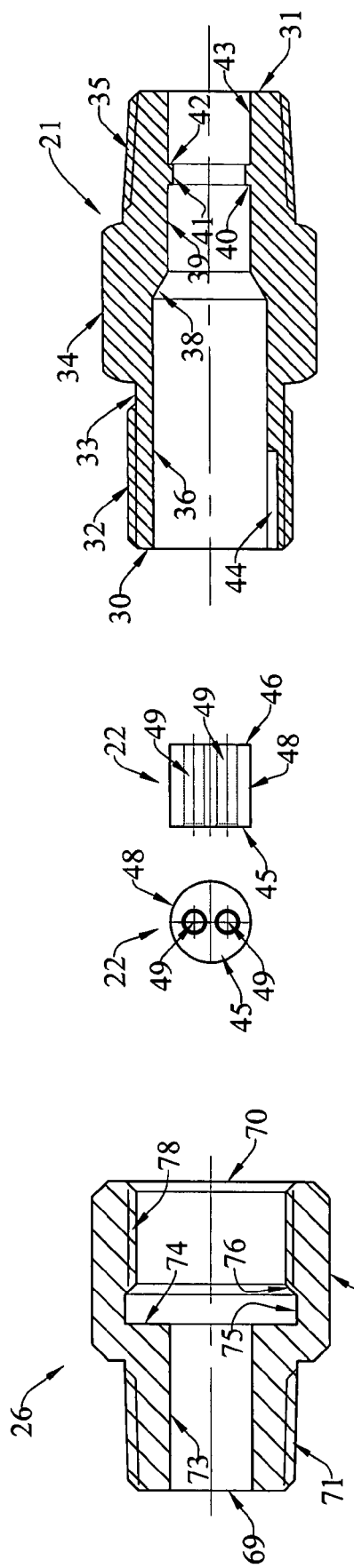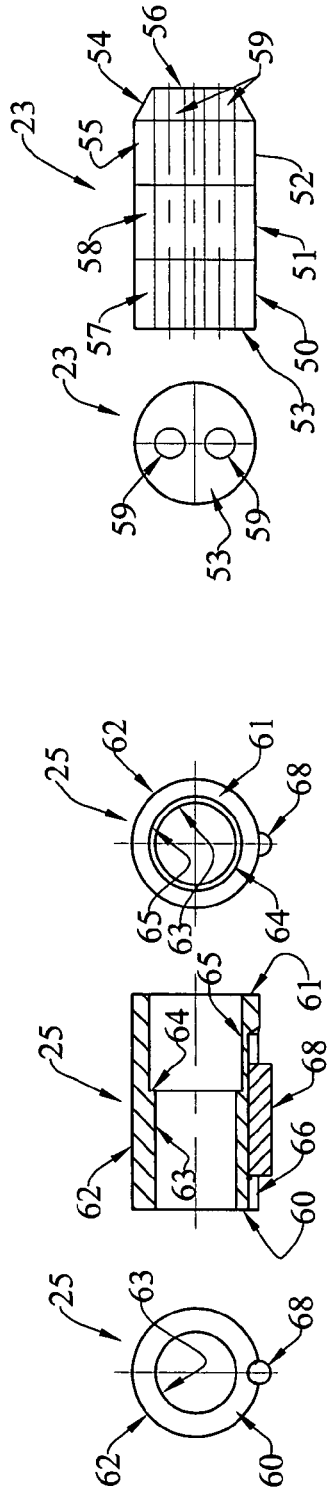

HAZARDOUS LOCATION SEALING GLAND

TECHNICAL FIELD

The present invention relates generally to the field of sealing glands, and, more particularly, to improved sealing glands that are suitable for use in hazardous environments for preventing fluid flow, pressure transmission and flame propagation between the gland and the penetrant portion of at least one insulated wire passing therethrough, and between and along the conductor and surrounding insulation of the penetrant portion of the wire.

BACKGROUND ART

In some hazardous environments, it is necessary to prevent fluid flow, pressure transmission and flame propagation between a sealing gland and the penetrant portion of one or more insulated wires passing through the gland. The need for this was recently documented in a report by the Canadian Transportation Safety Board. This report (hereinafter the "Report") is available at http://www.tsb.gc.ca/en/reports/pipe/2000/p00h0061/p00h0061.pdf. The Synopsis of this report reads as follows:

"At approximately 1724 on 28 Dec. 2000, a release of natural gas resulted in an explosion that destroyed the electrical and services building, highly damaged the compressor building, and damaged the remaining buildings at the East Hereford compressor station (Kilometre Post 217, 094) on line 300 of Gazoduc TQM Inc. Before the occurrence, the station had been shut down since approximately 1004 due an unintentional manual initiation of the station's emergency shutdown system. Following the emergency shutdown of the compressor station, a maintenance person was sent to the station to reinitiate the electric motor-driven compressor unit. During the day, after repeatedly trying to get the station into the ready state mode to return the station to normal pipeline operations, an explosion occurred. The onsite maintenance person was seriously injured." (Report at i).

The report concluded that the cause of the explosion was at least partially attributable to the propagation of natural gas along the electrical wires between the electrical conductors and the surrounding insulation. More particularly, that report attributed failure to:

"The failure to properly install sealing compounds and the failure to skin off the innerjacket of the cables to expose the conductors inside the sealing chamber in two electrical fittings affixed to the electrical TJB for the compressor unit provided an open channel for the free flow of natural gas through two electrical Teck cables between the explosion proof-rated compressor building and the non-explosion proof-rated electrical and services building (ESB); that was not in conformity with requirements of Canadian Electrical Code (CEC 22.1) ." (Id. at 29)

Thus, this report heralds the need to provide sealing glands that will prevent fluid flow, pressure transmission and flame propagation between and along the gland and the penetrant portion of an insulated wire passing therethrough, and between and along the conductor and surrounding insulation of the penetrant portion of the wire.

Other types of sealing glands have contemplated the use of compound sealants, such as epoxies and potting compounds. However, these are subject to cracking and incorrect installation. Moreover, these types of compound sealants may, under certain circumstances, allow the migration of explosive gases through and along stranded conductors.

Accordingly, it would be highly desirable to provide an improved sealing gland that is suitable for use in a hazardous environment for preventing fluid flow, pressure transmission and flame propagation between and along the gland and the penetrant portion of one or more insulated wires passes therethrough, and between and along the conductor and surrounding insulation of the penetrant portion of the wire.

DISCLOSURE OF THE INVENTION

With parenthetical reference to the corresponding parts, portions or surfaces of the disclosed embodiment, merely for purposes of illustration and not by way of limitation, the present invention broadly provides an improved sealing gland that is suitable for use in a hazardous environment for preventing fluid flow, pressure transmission and flame propagation between the gland and the penetrant portion of at least one insulated wire passing therethrough.

The improved sealing gland (20) broadly includes: a tubular body (21) adapted surround the wire, the body having rearwardly-facing first and second surfaces (40, 38) and having a threaded portion (32); a first insulator (22) surrounding the wire, the first insulator having a forwardly-facing first surface (46) adapted to engage the body first surface (40) and having a rearwardly-facing second surface (45); a sealant (23) surrounding the wire, the sealant having forwardly-facing first and second surfaces (54, 56) and having a rearwardly-facing third surface (53), the sealant first surface (54) adapted to engage the body second surface (38), the sealant second surface (56) adapted to engage the first insulator second surface (45); a second insulator (24) surrounding the wire, the second insulator having a forwardly-facing first surface (46) adapted to engage one portion of the sealant third surface (53), the second insulator having a rearwardly-facing second surface (45); a follower (25) surrounding the conductor and adapted to be mounted for axial movement relative to the body, but constrained against rotation relative to the body, the follower having a forwardly-facing first surface (61) adapted to engage one portion of the sealant third surface (53) and having a forwardly-facing second surface (64) adapted to engage another portion of the second insulator second surface (45), and having a rearwardly-facing third surface (60); and a cap (26) adapted to surround the wire, the cap having a threaded portion (78) adapted to matingly engage the body threaded portion (32) and having a forwardly-facing first surface (74) adapted to engage the follower third surface (60); the sealing gland being so dimensioned and proportioned that when the cap is tightened on the body, the sealant will be deformed into fluid-tight sealed engagement with the body and wire to prevent fluid flow, pressure transmission and flame propagation between and along the gland and the penetrant portion of at least one insulated wire passing therethrough, and between and along the conductor and the surrounding insulation of the penetrant portion of the wire.

The improved gland may further include: a first sleeve (28) surrounding the wire and mounted on the body to prevent damage to the wire due to acute flexure of the wire proximate its exit from the body, and a second sleeve (29) surrounding the wire and mounted on the cap to prevent damage to the wire due to acute flexure of the wire proximate its exit from the cap.

The first and second sleeves may be formed of resilient material, and the sealant may be formed of an electrically-conductive material, such as Grafoil®. (Grafoil® is a registered trademark of, and such product is available from, Graftech Inc., 11709 Madison Avenue, Lakewood, Ohio 44107.) The wire may be selected from the group consisting of THHN, THWN and TFN, and may be 14-, 16- or 18-gauge, as desired. These are standard abbreviations for different types of wire, and are taken from the National Electrical Code. As indicated therein, THHN refers to "thermoplastic insulation (PVC), high heat resistant, 90° C. rating, dry or damp locations, nylon jacket", THWN refers to "thermoplastic insulation (PVC), heat resistant, 75° C. rating, wet locations, nylon jacket", and TFN refers to "thermoplastic insulation (PVC), fixture wire, 90° C. dry locations, nylon jacket". The sealant may comprise three pieces.

The sealing gland is adapted to resist fluid flow, pressure transmission and flame propagation between the wire and the gland, and within the wire (e.g., between the conductor and surrounding insulation), in either longitudinal direction. When the cap is suitably tightened on the body, the seal established between the body and wire will resist a pressure differential along the wire of about 1000 psig.

The body second surface and the sealant first surface may be frusto-conical.

The sealing gland is suitable for use in a hazardous environment (e.g, as defined in Article 500 of the National Electrical Code) for preventing fluid flow, pressure transmission and flame propagation between the gland and penetrant portions of a plurality of insulated wires.

The first insulator (22) may be a tubular member having a bore, and wherein this bore may be chamfered adjacent the first insulator second surface. The second insulator may also be a tubular member having a bore, and wherein this bore is chamfered adjacent the second insulator first surface.

Accordingly, the general object of the present invention is to provide an improved sealing gland that is suitable for use in a hazardous environment for preventing fluid flow, pressure transmission and flame propagation between the gland and the penetrant portion, and within and along such penetrant portion (e.g., between the conductor and surrounding insulation), of at least one insulated electrical wire passing therethrough.

These and other objects and advantages will become apparent from the foregoing and ongoing written specification, the drawings, and the appended claims.

BRIEF DESCRIPTION OF THE DRAWINGS

FIG. 1 is an exploded aligned longitudinal vertical sectional view of an improved sealing gland for use in a hazardous environment, with the associated electrical wires removed for clarity of illustration.

FIG. 2 is a longitudinal vertical sectional view of the assembled sealing gland shown in FIG. 1, and showing two electrical wires as penetrating the gland.

FIG. 3 is a front elevation of the assembled gland shown in FIG. 2.

FIG. 4 is an enlarged longitudinal vertical sectional view of the cap shown in FIG. 1.

FIG. 5 is an enlarged longitudinal vertical sectional view of the follower and non-rotation pin shown in FIG. 1.

FIG. 6 is a left end view of the follower shown in FIG. 5.

FIG. 7 is a right end view of the follower shown in FIG. 5.

FIG. 8 is an enlarged longitudinal side elevation of the first insert shown in FIG. 1.

FIG. 9 is a left end elevation of the first insert shown in FIG. 8.

FIG. 10 is an enlarged side elevation of the three-part sealant shown in FIG. 1, prior to compression.

FIG. 11 is a left end view of the sealant shown in FIG. 10.

FIG. 12 is an enlarged longitudinal sectional view of the tubular body shown in FIG. 1.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and, more particularly, to FIGS. 1-3 thereof, the present invention broadly provides an improved sealing gland, of which the presently-preferred embodiment is generally indicated at 20, for preventing fluid flow, pressure transmission and flame propagation both between the gland and the penetrant portion of at least one insulated electrical wire passing therethrough, and within and along such penetrant portion, such as between a conductor and the surrounding insulation.

In FIG. 1, the improved sealing gland is shown as broadly including a tubular body 21, a first insulator 22, a three-part sealant 23, a second insulator 24, a follower 25, and a cap 26. The assembly may optionally further include a rightwardmost first sleeve 28 and a leftwardmost second sleeve 29.

In the illustrated form of the invention, two electrical wires, severally indicated at W are shown as penetrating the sealing gland. However, this number is merely for purposes of illustration. It should be noted that a greater or lesser number of wires could penetrate the sealing gland. Accordingly, the appended claims are not to be construed as being limited to only the preferred embodiment illustrated and described.

FIG. 1 is an exploded aligned longitudinal vertical sectional view of the sealing gland, with the wires omitted. FIG. 2 is a fragmentary longitudinal vertical sectional view of the assembled sealing gland, showing the sealant as having been compressed into fluid-tight sealing engagement with the penetrant portions of wires W, W. FIG. 3 is a front elevation of the structure shown in FIG. 2.

Referring now to FIG. 12, body 21 is shown as being a horizontally-elongated specially-configured tubular member having an annular vertical left end face 30; an annular vertical right end face 31; and an outer surface that sequentially includes (from left-to-right in FIG. 12): an externally-threaded portion 32 extending rightwardly from the outer margin of left end face 30, an outwardly-facing horizontal cylindrical surface 33, a radially-enlarged hexagonal portion 34, and an externally-threaded portion 35 extending rightwardly therefrom to join the outer margin of right end face 31. The body is shown as having an axial through-bore that is sequentially bounded by: an inwardly-facing horizontal cylindrical surface 36 extending rightwardly from the inner margin of left end face 30, a leftwardly- and inwardly-facing frusto-conical surface 38, an inwardly-facing horizontal cylindrical surface 39, a leftwardly-facing annular vertical surface 40, an inwardly-facing horizontal cylindrical surface 41, a rightwardly-facing annular vertical surface 42, and an inwardly-facing horizontal cylindrical surface 43 continuing right-wardly therefrom to join the inner margin of right end face 31. A concave recess 44, having a somewhat semi-cylindrical cross-section, extends rightwardly into the body from the 6:00 o'clock position of its left end face to accommodate and receive sliding insertion of a complimentarily-configured lug provided on the follower, as described infra. Threaded portion 35 is provided on tubular body 21 so that the body may be suitably connected to other structure (not shown). Threaded portion 32 is provided on the body to matingly receive a complimentarily-configured internally-threaded portion on the cap, described infra.

Referring now to FIGS. 8 and 9, the first insulator 22 is shown as being a horizontally-elongated cylindrical member having an annular vertical left end face 45, an annular vertical right end face 46, and an outwardly-facing horizontal cylindrical surface 48. This insulator is shown as being provided with two longitudinal through-holes, severally indicated at 49, to accommodate passage of the penetrant portions of wires W, W. As previously indicated, the illustrated form depicts the sealing gland as accommodating passage of two of wires W. However, in alternative arrangements, the inserts and sealants could be provided with a greater or lesser number of holes to accommodate passage of a greater or lesser number of wires, as desired.

Referring now to FIGS. 10 and 11, the sealant 23 is shown as being a stacked assembly of three individual pieces, indicated at 50, 51 and 52, respectively. Pieces 50 and 51 are horizontally-elongated cylindrical members. Thus, left segment 50 is shown as having a horizontal circular left end face 53. Segment 50 also has a circular right end face arranged to abut the circular left end face of middle segment 51. Similarly, middle segment 51 has a circular right end face that is arranged to abut the circular left end face of rightward segment 52. Segment 52 differs from segments 50, 51 in that it has a rightwardly- and outwardly-facing frusto-conical surface 54 extending from its outer cylindrical surface 55 to join its circular right end face 56. Segments 50 and 51 are shown as having outer cylindrical surfaces 57 and 58, respectively. These three segments, 50, 51 and 52, are stacked such that their outer cylindrical surfaces 55, 57 and 58 form a horizontally-elongated continuous cylindrical surface. Each segment has a through-hole, severally indicated at 59. These through-holes are adapted to aligned with through-holes 49 in first insert 22 for the common purpose of accommodating passage of the penetrant portions of wires W, W.

In the presently-preferred embodiment, the sealant is formed of an electrically-conductive material, such as Grafoil®. This is a graphite-type of product that has a relatively low modulus of elasticity, and may be compressed into fluid-tight sealing engagement with the outer surface of the insulation of each wire W. However, the invention is not limited to use with this particular sealant material.

Adverting now to FIG. 1, the second insulator 24 is, for intents and purposes, identical to first insulator 22, previously described. Since the first insulator has been fully described, a detailed description of the like structure of the second insulator will be omitted, it being understood that like reference numerals associated with the second insulator refer to the corresponding structure previously described with respect to the first insulator.

Referring now to FIGS. 5-7, the follower is shown as being a horizontally-elongated specially-configured tubular member having an annular vertical left end face 60, an annular vertical right end face 61, and an outwardly-facing horizontal cylindrical surface 62 extending between the outer margins of end faces 60, 61. The follower is shown as having a stepped axial through-bore that is bounded by: an inwardly-facing horizontal cylindrical surface 63 extending rightwardly from the inner margin of left end face 60, a rightwardly-facing annular vertical surface 64, and an inwardly-facing horizontal cylindrical surface 65 continuing rightwardly therefrom to join the inner margin of right end face 61. A horizontal groove 66 extends horizontally into the follower from the 6:00 o'clock position of its left end face 60. This groove has a semi-cylindrical concave cross-section. A horizontally-elongated cylindrical pin 68 is suitably secured, as by welding, in groove 66. Pin 68 extends downwardly beyond the outer surface 62 of the follower to form a lug, and is adapted to be slidably received in body groove 44.

Referring now to FIG. 4, cap 26 is shown as being a horizontally-elongated specially-configured tubular member having an annular vertical left end face 69; an annular vertical right end face 70; and a stepped outer surface that sequentially includes, in pertinent part: an externally-threaded portion 71 extending rightwardly from the outer margin of left end face 69, and a radially-enlarged hexagonal portion 72 continuing rightwardly therefrom to join the outer margin of right end face 70. Cap 26 has a stepped axial through-bore that is sequentially bounded by: an inwardly-facing horizontal cylindrical surface 73 extending rightwardly from the inner margin of left end face 69, a rightwardly-facing annular vertical surface 74, an inwardly-facing horizontal cylindrical surface 75, an inwardly- and leftwardly-facing frusto-conical surface 76, and an internally-threaded portion 78 continuing rightwardly therefrom to join the inner margin of right end face 70. Cap threaded portion 78 is adapted to matingly engage body threaded portion 32, as described infra.

Referring now to FIG. 1, first sleeve 28 is shown as being a horizontally-elongated tubular member having an annular vertical left end face 79, a rightwardly- and inwardly-facing frusto-conical right end face 80, an outer cylindrical surface 81, and an inner cylindrical surface 82 extending rightwardly from the inner margin of left end face 79 to join the inner margin of right end face 80.

Still referring to FIG. 1, second sleeve 29 is shown as being a mirror image of first sleeve 28. In this regard, the second sleeve is shown as having a leftwardly- and inwardly-facing frusto-conical surface 83, a rightwardly-facing annular vertical surface 84, an outwardly-facing horizontal cylindrical surface 85, and an inner cylindrical surface 86 extending rightwardly from the inner margin of left end face 83 to join the inner margin of right end face 84.

Each of sleeves 28, 29 is preferably formed of a low-friction material, such as polytetrafluoroethylene, and functions to prevent damage to the wires due to acute flexing thereof proximate their exits from the body and cap, respectively.

The improved sealing gland is assembled as shown in FIGS. 1 and 2. Wires W, W are first fed through the openings in the first and second insulators and the sealant material. As previously noted, the illustrated form accommodates passage of two wires. However, this is merely for purposes of illustration, and, in other forms, a larger or smaller number of wires could be similarly accommodated. The first sleeve 28 is adapted to be pressed-fitted into frictional engagement with the rightward body opening. Similarly, the second sleeve 29 is adapted to be pressed fitted into the left margin end of the cap opening. The function of these sleeves is simply to prevent damage to the wires due to acute flexure of the wires proximate their exit from the body and cap, respectively. In assembling the device, the right end face 46 of first insulator 22 bears against body shoulder surface 40. The left end face of the first insulator bears against the right end face 56 of the sealant. The left end face 53 of the sealant abuts the right end face of second insulator 24. The left end face of second insulator 24 abuts follower shoulder surface 64. The left end face 60 of the follower bears against cap surface 74. Follower pin or lug 68 is received in body groove 44 to prevent relative rotation of the follower when the cap is tightened on the body. In other words, by virtue of this key-keyway connection between the follower and the body, the follower is constrained to move only axially relative to the body when the cap is tightened onto the body.

When the cap is progressively tightened on the body, the sealant is progressively compressively conformed into fluid tight sealed engagement with the outer surface of wires W. The extent of sealant compression is visually depicted by the compressed size of the sealant in FIG. 2, as compared to its uncompressed state shown in FIG. 1.

Thus, the present invention provides an improved sealing gland that is suitable for use in a hazardous environment for preventing fluid flow, pressure transmission and flame propagation between the sealing gland and the penetrant portion of at least one insulated wire passing therethrough, and, further, within such penetrant portion, as by passing between and along the conductor and the surrounding insulation.

MODIFICATIONS

The present invention expressly contemplates that many changes and modifications may be made. For example, the materials of construction are not deemed to be particularly critical, and may be varied. In the appended claims, references to specific materials are not intended to limit the scope of the invention, but are simply to utilize the doctrine of claim differentiation to indicate that an antecedent claim not expressly containing such limitation is not so limited. The key-keyway connection between the follower and the body may be changed, and is not limited to the specific form shown. Other types of compressible sealants may be substituted for the preferred sealant material, Grafoil®, disclosed herein. The invention is not necessarily limited to use with THHN, THWN or TFN wire, or with wires of the particular gauges specified.

Therefore, while the presently preferred form of the improved sealant gland has been shown and described, and several modifications and changes thereof discussed, persons skilled in this art will readily appreciate that various additional changes and modifications may be made without departing from the spirit of the invention, as defined and differentiated by the following claims.

What is claimed is:

1. A sealing gland suitable for use in a hazardous environment for preventing fluid flow, pressure transmission and flame propagation between said gland and the penetrant portion of at least one insulated wire passing therethrough, and within and along the wire, comprising:
    a tubular body surrounding said wire, said body having rearwardly-facing first surface, having a rearwardly-facing frusto-conical second surface and having a threaded portion;
    a first insulator surrounding said wire, said first insulator having a forwardly-facing first surface adapted to engage said body first surface and having a rearwardly-facing second surface;
    a sealant surrounding said wire, said sealant having a forwardly-facing frusto-conical first surface, having a forwardly-facing second surface and having a rearwardly-facing third surface, said sealant first surface adapted to engage said body second surface, said sealant second surface adapted to engage said first insulator second surface;
    a second insulator surrounding said wire, said second insulator having a forwardly-facing first surface adapted to engage one portion of said sealant third surface, said second insulator having a rearwardly-facing second surface;
    a follower surrounding said wire and adapted to be mounted for axial movement relative to said body, but constrained against rotation relative to said body, said follower having a forwardly-facing first surface adapted to engage said sealant third surface, having a forwardly-facing second surface adapted to engage a portion of said second insulator second surface, and having a rearwardly-facing third surface; and
    a cap surrounding said wire, said cap having a threaded portion adapted to matingly engage said body threaded portion and having a forwardly-facing first surface adapted to engage said follower third surface;
    said sealing gland being so dimensioned and proportioned that when said cap is tightened on said body, said sealant will be deformed into fluid-tight sealed engagement with said body and wire to prevent fluid flow, pressure transmission and flame propagation between the gland and the penetrant portion, and within and along the wire.

2. A sealing gland as set forth in claim 1, and further comprising:
    a first sleeve surrounding said wire and mounted on said body to prevent damage to said wire due to acute flexure of said wire proximate its exit from said body.

3. A sealing gland as set forth in claim 2, and further comprising:
    a second sleeve surrounding said wire and mounted on said cap to prevent damage to said wire due to acute flexure of said wire proximate its exit from said cap.

4. A sealing gland as set forth in claim 3 wherein said first and second sleeves are formed of resilient material.

5. A sealing gland as set forth in claim 1 wherein said sealant is formed of an electrically-conductive material.

6. A sealing gland as set forth in claim 1 wherein said wire is selected from the group consisting of THHN, THWN and TFN.

7. A sealing gland as set forth in claim 1 wherein said sealant comprises three pieces.

8. A sealing gland as set forth in claim 1 wherein wire has a conductor surrounded by insulation, and wherein said sealing gland is adapted to resist fluid flow, pressure transmission and flame propagation between said wire and gland, and within said wire between said conductor and insulation, in either axial direction.

9. A sealing gland as set forth in claim 1 wherein, when said cap is suitably tightened on said body, the seal established between said body and wire will resist a pressure differential along said wire of about 1000 psig.

10. A sealing gland as set forth in claim 1 wherein said sealing gland is suitable for use in a hazardous environment for preventing fluid flow, pressure transmission and flame propagation between said gland and penetrant portions of a plurality of insulated wires.

11. A sealing gland as set forth in claim 1 wherein said first insulator is a tubular member having a bore, and wherein said bore is chamfered adjacent said first insulator second surface.

12. A sealing gland as set forth in claim 1 wherein said second insulator is a tubular member having a bore, and wherein said bore is chamfered adjacent said second insulator first surface.

* * * * *